(12) United States Patent
Heeter et al.

(10) Patent No.: US 10,746,031 B2
(45) Date of Patent: Aug. 18, 2020

(54) ANNULUS FILLER

(71) Applicant: Rolls-Royce Corporation, Indianapolis, IN (US)

(72) Inventors: Robert Heeter, Noblesville, IN (US); Matthew J. Kappes, Greenwood, IN (US)

(73) Assignee: Rolls-Royce Corporation, Indianapolis, IN (US)

(*) Notice: Subject to any disclaimer, the term of this patent is extended or adjusted under 35 U.S.C. 154(b) by 169 days.

(21) Appl. No.: 16/037,980

(22) Filed: Jul. 17, 2018

(65) Prior Publication Data

US 2019/0112934 A1 Apr. 18, 2019

Related U.S. Application Data

(60) Provisional application No. 62/534,015, filed on Jul. 18, 2017.

(51) Int. Cl.
*F01D 5/30* (2006.01)
*F01D 11/00* (2006.01)

(52) U.S. Cl.
CPC ............ *F01D 5/30* (2013.01); *F01D 11/008* (2013.01); *F05D 2220/32* (2013.01); *F05D 2220/36* (2013.01); *F05D 2230/20* (2013.01); *F05D 2230/21* (2013.01); *F05D 2230/41* (2013.01); *F05D 2230/90* (2013.01); *F05D 2240/30* (2013.01); *F05D 2300/2102* (2013.01); *F05D 2300/224* (2013.01); *F05D 2300/43* (2013.01); *F05D 2300/433* (2013.01); *F05D 2300/603* (2013.01); *F05D 2300/6012* (2013.01)

(58) Field of Classification Search
CPC .... F01D 5/30; F01D 11/008; F05D 2300/603; F05D 2300/433; F05D 2300/6012; F05D 2300/43; F05D 2300/224; F05D 2300/2102; F05D 2220/36; F05D 2230/90
See application file for complete search history.

(56) References Cited

U.S. PATENT DOCUMENTS 4,957,415 A 9/1990 Paul et al.
5,182,906 A 2/1993 Gilchrist et al.
(Continued)

FOREIGN PATENT DOCUMENTS

DE 102010005897 A1 2/2011
WO 2015142395 A2 9/2015

OTHER PUBLICATIONS

Innegra Technologies Corporate Presentation, pp. 1-24, Year 2014 (Year: 2014).*

(Continued)

*Primary Examiner* — Brian P Wolcott
(74) *Attorney, Agent, or Firm* — Shumaker & Sieffert, P.A.

(57) ABSTRACT

An annulus filler may include an outer lid defining an airflow surface for air being drawn through the engine in an axial airflow direction and a support structure configured to connect the outer lid to a rotor disc. The annulus filler may include a composite material including a plurality of relatively high-modulus reinforcement elements, a plurality of relatively tough polymer-based reinforcement elements, and a matrix material substantially encapsulating the plurality of relatively high-modulus reinforcement elements and the plurality of relatively tough reinforcement elements.

19 Claims, 4 Drawing Sheets

(56) References Cited

U.S. PATENT DOCUMENTS

| | | | |
|---|---|---|---|
| 5,252,160 | A | 10/1993 | Scanlon et al. |
| 6,217,283 | B1 | 4/2001 | Ravenhall et al. |
| 6,358,014 | B1 | 3/2002 | Chou et al. |
| 6,416,280 | B1 | 7/2002 | Forrester et al. |
| 6,447,255 | B1 | 9/2002 | Bagnall et al. |
| 6,561,763 | B2 | 5/2003 | Breakwell |
| 6,942,462 | B2 | 9/2005 | Breakwell et al. |
| 8,092,183 | B2 | 1/2012 | Borzakian et al. |
| 8,292,586 | B2 | 10/2012 | Bottome |
| 8,425,197 | B2 | 4/2013 | Breakwell |
| 8,529,204 | B2 | 9/2013 | Bagnall |
| 8,596,981 | B2 | 12/2013 | Hoylund et al. |
| 8,616,849 | B2 | 12/2013 | Menheere et al. |
| 8,677,622 | B2 | 3/2014 | Schreiber |
| 8,753,094 | B2 | 6/2014 | Bottome |
| 8,827,651 | B2 | 9/2014 | Bottome |
| 8,911,656 | B2 * | 12/2014 | Doddman ............ B29C 70/446 264/241 |
| 9,017,031 | B2 * | 4/2015 | Bottome .............. F01D 11/008 416/193 R |
| 9,200,595 | B2 | 12/2015 | Bottome |
| 9,228,444 | B2 * | 1/2016 | Evans .................. F01D 5/3007 |
| 9,410,431 | B2 * | 8/2016 | Bottome .............. F01D 5/066 |
| 9,481,448 | B2 | 11/2016 | Totten et al. |
| 9,682,450 | B2 | 6/2017 | Tomeo et al. |
| 9,739,162 | B2 * | 8/2017 | Bottome .............. F01D 11/008 |
| 9,752,449 | B2 | 9/2017 | Bottome et al. |
| 2001/0031594 | A1 | 10/2001 | Perez et al. |
| 2012/0244003 | A1 | 9/2012 | Mason |
| 2012/0263596 | A1 | 10/2012 | Evans et al. |
| 2014/0086751 | A1 * | 3/2014 | Bottome .............. F01D 11/008 416/193 R |
| 2014/0186166 | A1 * | 7/2014 | Kostka ................. F01D 5/282 415/182.1 |
| 2014/0255202 | A1 | 9/2014 | Kling et al. |
| 2015/0132134 | A1 | 5/2015 | Murdock |
| 2015/0198174 | A1 * | 7/2015 | Houle .................. F01D 5/3061 416/190 |
| 2015/0300194 | A1 * | 10/2015 | Bottome .............. F01D 11/008 416/193 R |
| 2016/0010459 | A1 | 1/2016 | Romanowski et al. |

OTHER PUBLICATIONS

Sloan et al., "GE Aviation, Batesville, MS, US," compositesworld.com, Feb. 8, 2016, 5 pp.
Meister et al., "Switzerland: The Engine of the Future," maschinenmarkt, Jan. 20, 2016, 2 pp.
"Olefin-Carbon Fiber Hybrid Wins JEC Innovation Award," plasticstoday.com, Oct. 3, 2013, 2 pp.
Gardiner, "HP-RTM on the Rise," compositesworld.com, Apr. 14, 2015, 6 pp.
Black, "Automotice Composites: Thermosets for the Fast Zone," compositesworld.com Aug. 31, 2015, 6 pp.
"Corporated Technologies," Innegra Technologies, 2014 (Applicant points out, in accordance with MPEP 609.04(a), that the year of publication, 2014, is sufficiently earlier than the effective U.S. filing date, 2014, so that the particular month of publication is not in issue.) 24 pp.
Horejsi et al., "FACC AG & CleanSky," CleanSky, Jan. 2011, 18 pp.
"Final Report Summary—Orca (Development of an Optimized Large Scale Engine CFRP annulus filler)," retrieved from https://cordis.europa.eu/result/rcn/147995_en.html, Jul. 13, 2018, 3 pp.
U.S. Appl. No. 15/876,574, filed Jan. 22, 2018, by Heeter et al.

\* cited by examiner

ANNULUS FILLER

The application claims the benefit of U.S. Provisional Application No. 62/534,015, filed Jul. 18, 2017, the entire contents of which is incorporated by reference herein.

TECHNICAL FIELD

The present disclosure relates to annulus fillers for bridging the gap between adjacent blades of a gas turbine engine.

BACKGROUND

Each stage in a gas turbine engine includes a plurality of radially extending rotor blades, which are attached to a rotor disc. Near the radially inward portion of the rotor blades, adjacent to the rotor disc, the space between adjacent rotor blades may be filled by platforms integral to the respective rotor blades or by annulus fillers, which are separate from the rotor blades. Annulus fillers, by bridging the gap between the rotor blades, may define a radially inward airflow surface for air drawn through the gas turbine engine.

SUMMARY

In some examples, the disclosure describes an annulus filler that includes an outer lid defining an airflow surface for air being drawn through the engine in an axial airflow direction; and a support structure configured to connect the outer lid to a rotor disc. The annulus filler may include a composite material including a plurality of relatively high-modulus reinforcement elements, a plurality of relatively tough polymer-based reinforcement elements, and a matrix material substantially encapsulating the plurality of relatively high-modulus reinforcement elements and the plurality of relatively tough reinforcement elements.

In some examples, the disclosure describes a method that includes defining an annulus filler with a matrix material, a plurality of relatively high-modulus reinforcement elements and a plurality of relatively tough reinforcement elements. The annulus filler may include an outer lid and a support structure. The method also may include curing a matrix material substantially encapsulating the plurality of relatively high-modulus reinforcement elements and the plurality of relatively tough reinforcement elements.

The details of one or more examples are set forth in the accompanying drawings and the description below. Other features, objects, and advantages will be apparent from the description and drawings, and from the claims.

DETAILED DESCRIPTION

Figure 1:
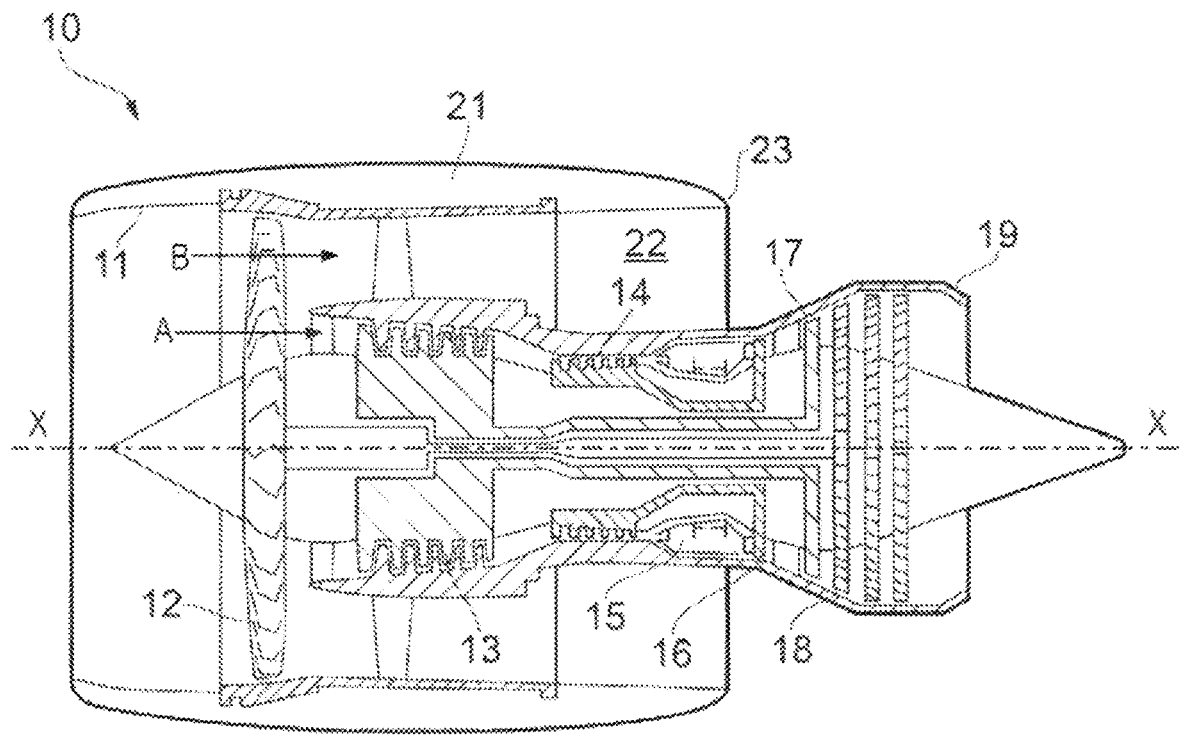
FIG. 1 is a schematic diagram illustrating a longitudinal cross-section view of an example high-bypass gas turbine engine.

The disclosure describes articles including annulus fillers and techniques for forming articles that include annulus fillers. Annulus fillers may also be referred to as fan platforms. An annulus filler as described herein may be formed of a composite material, which may include a matrix material, relatively high-modulus reinforcement elements, e.g., carbon fiber, and relatively tough polymer-based reinforcement elements, e.g., high modulus polypropylene. As used herein, a relatively high-modulus reinforcement element has a Young's modulus (or elastic modulus) of at least 60 GPa, and a relatively tough polymer-based reinforcement element has a strain elongation at break of greater than 6.0%. Such annulus fillers may be relatively lightweight, yet strong to resist forces acting upon the annulus filler. By including relatively tough polymer-based reinforcement elements in addition to relatively high-modulus reinforcement elements, the annulus filler may have increased toughness (i.e., reduced brittleness), which may increase resistance to fracturing when struck by a foreign object, e.g. birds or hailstones.

Annulus fillers may be placed between rotor blades or propulsor within a gas turbine engine stage. An annulus filler may include an outer lid that defines a radially inward airflow surface for air drawn through a gas turbine engine and a support structure, which connects the outer lid to the rotor disc. The outer lid of the annulus filler may be at risk of being struck by foreign objects during operation of the gas turbine engine.

In some examples, an annulus filler may include regions, such as the outer lid, that may include a higher ratio of relatively tough polymer-based reinforcement elements compared to other regions of the annulus filler. A higher ratio of relatively tough polymer-based reinforcement elements may result in added toughness compared to regions with a lower ratio of relatively tough polymer-based reinforcement elements. On the other hand, in some examples, other regions, such as the support structure, may include a lower ratio of relatively tough polymer-based reinforcement elements (i.e., a higher ratio of relatively high-modulus reinforcement elements), which may result in greater strength at the cost of increased brittleness. As the regions that include a lower ratio of relatively tough polymer-based reinforcement elements may be less likely to be impacted by a foreign object, the brittleness may not be a primary design concern for these regions.

In some examples, the reinforcement elements included in the composite materials may be arranged into two- or three-dimensional reinforcement architectures. The relatively tough polymer-based reinforcement materials may be separate from, intermixed with, interwoven with, or braided with the relatively high-modulus reinforcement materials, depending on the particular properties selected for a particular region of the annulus filler. Further, different regions of the annulus filler may include different combinations of only relatively tough polymer-based reinforcement elements, only relatively high-modulus reinforcement elements, or mixtures, filament windings, unidirectional tapes, weaves, braids, or the like of relatively tough polymer-based reinforcement elements and relatively high-modulus reinforcement elements.

FIG. 1 is a schematic diagram illustrating a longitudinal cross-section view of an example high-bypass gas turbine engine 10. The principal and rotational axis of rotating elements of gas turbine engine 10 is X-X. Gas turbine engine 10 includes an air intake 11, a fan 12, and a core flow system A. The fan 12 includes rotor blades which are attached to a rotor disc. The core flow system A includes an intermediate-pressure compressor 13, a high-pressure compressor 14, a combustion chamber 15, a high-pressure turbine 16, an intermediate-pressure turbine 17, a low-pressure turbine 18, and a nozzle 19. Furthermore, outside the core flow system A, the gas turbine engine includes bypass flow system B. The bypass flow system B includes a nacelle 21, a fan bypass 22, and a fan nozzle 23.

Thrust, which propels an aircraft, is generated in a high-bypass gas turbine engine by both the fan 12 and the core flow system A. Air enters the air intake 11 and flows substantially parallel to the X-X axis past the rotating fan 12, which increases the air velocity to provide a portion of the thrust. A first portion of the air that passes between the rotor blades of the fan 12 enters the core flow system A, while a second portion enters the bypass flow system B. Air that enters the core flow system A is first compressed by intermediate-pressure compressor 13, then a high-pressure compressor 14. The air in core flow system A enters combustion chamber 15, where it is mixed with fuel and ignited. The air that leaves the combustion chamber 15 has an elevated temperature and pressure compared to the air that first entered the core flow system A. The air with elevated temperature and pressure produces work to rotate, in succession, a high-pressure turbine 16, an intermediate-pressure turbine 17, and a low-pressure turbine 18, before ultimately leaving the core flow system A through the nozzle 19. The rotation of turbines 16, 17, and 18 rotates high-pressure compressor 14, intermediate pressure compressor 13, and fan 12, respectively. Air that passes through the bypass flow system B does not undergo compression or combustion and does not produce work which rotates turbines but contributes propulsive thrust to gas turbine engine 10.

During operation, blades of fan 12 rotate around the X-X axis, driven by low-pressure turbine 18. Annulus fillers may be mounted between the rotor blades of fan 12, bridging the gap between the blades of fan 12. Annulus fillers may include an outer lid that defines a radially inward surface for X-X axial flow of air between the blades of fan 12. Annulus fillers may also include a support structure, which connects the outer lid to the rotor disc to which the blades of fan 12 are also connected.

In accordance with the disclosure, an annulus filler utilized in gas turbine engine 10 may be formed of a composite material, which may include a matrix material, relatively tough polymer-based reinforcement elements, and relatively high-modulus reinforcement elements. The relatively high-modulus reinforcement elements may have a higher Young's modulus (also referred to as the elastic modulus) than the relatively tough polymer-based reinforcement elements and may contribute to the strength of the annulus filler, while the relatively tough polymer-based reinforcement element may have a higher strain elongation at break than the relatively high-modulus reinforcement elements and may contribute to the toughness of the annulus filler.

The matrix material may include a material configured to substantially surround the reinforcement elements. In some examples, the matrix material may include, for example, a thermoset polymer, such as an epoxy, bismaleimide, or polyester; or a thermoplastic matrix, such as polyether ether ketone (PEEK), a PEEK polyetherimide (PEI) copolymer, poly(p-phenylene sulfide) (PPS); or the like. In some examples, the matrix material may be a material that cures at a relatively low temperature, such as less than about 150° C., which may enable use of some relatively tough polymer-based reinforcement elements in the annulus filler. For example, some epoxy resins may cure at a temperature of less than about 150° C., such as at a temperature of about 125° C. An example epoxy that cures at a temperature of about 125° C. in about 1 hour is CYCOM® 823 RTM, available from Cytec Solvay Group, Brussels, Belgium. An example of an epoxy that cures at a temperature of about 150° C. in about 2 minutes is HexPly® M77, available from HEXCEL® Corporation, Stamford, Conn.

The relatively high-modulus reinforcement elements may include continuous fibers, short fibers, particulates, or the like. In some examples, the relatively high-modulus reinforcement elements have a relatively high Young's modulus (or elastic modulus), such as greater than 60 GPa. Example reinforcement elements that have an elongation at break of less than 6.0% and a Young's modulus of greater than 60 GPa include aromatic polyamide fibers, such as Kevlar®, available from E. I. du Pont de Nemours and Company, Wilmington, Del.; carbon fibers, such as carbon fibers derived from polyacrylonitrile fibers; and some glass fibers, such as E-glass, an alumino-borosilicate glass with less than 1% weight-per-weight alkali oxides or S-glass (an alumino silicate glass excluding CaO and including MgO). In some examples, the Young's modulus of the relatively high-modulus reinforcement element may be greater than about 90 GPa, or greater than about 120 GPa, or greater than about 200 GPa. For example, carbon fibers may have a Young's modulus of between about 225 GPa and about 300 GPa.

In some examples, the relatively high-modulus reinforcement elements may be relatively brittle, e.g., may have a relatively low elongation at break. For example, the relatively high-modulus reinforcement elements may have an elongation at break of less than 6.0%. In some examples, the elongation at break may be lower than 6.0%, such as less than 5.0%, or less than 2.0%. Because of this, while an annulus filler including a matrix material and relatively high-modulus reinforcement elements may provide significant stiffness and tensile strength to the annulus filler, the impact resistance of an annulus filler that includes only a matrix material and relatively high-modulus reinforcement elements may be relatively brittle and suffer brittle failure upon impact from a foreign object, such as ice, a bird, or the like. Further, the relatively high-modulus reinforcement elements may be relatively dense. For example, carbon fibers may have a density of around 1.8 g/cm$^3$, aromatic polyamide fibers may have a density of around 1.4-1.5 g/cm$^3$, and glass fibers may have a density of greater than 2.0 g/cm$^3$.

The annulus fillers described herein may additionally include relatively tough polymer-based reinforcement elements. In some examples, the relatively tough polymer-based reinforcement elements may have an elongation at break of greater than 6.0%. By possessing a higher elongation at break than the relatively high-modulus reinforcement elements, the relatively tough polymer-based reinforcement elements may contribute greater toughness to the annulus filler and may make the annulus filler more resistant to impact damage, such as damage due to impact from a foreign object, such as ice, a bird, or the like. In some examples, the relatively tough polymer-based reinforcement elements may have an elongation at break that is greater than that of the matrix material. This may allow the relatively tough polymer-based reinforcement elements to provide at least some structural integrity to the annulus filler even if the matrix material cracks or breaks. In some examples, the elongation at break of the relatively tough polymer-based reinforcement elements may be significantly higher than 6.0%, such as greater than 10.0%, greater than 15.0%, greater than 20.0%, or greater than 25.0%.

The relatively tough polymer-based reinforcement elements may include, for example, a polyamide; a polyester or polyester terephthalate (PET), such as Dacron®, available from IVISTA, Wichita, Kans., or Vectran®, available from Kuraray Co., Ltd., Tokyo, Japan; a polypropylene, such as a high modulus polypropylene (HMPP), for example Innegra'S, available from Innegra Technologies™, Greenville S.C.; a polyethylene, such as high density polyethylene, high performance polyethylene, or ultra-high molecular weight polyethylene; or spider silk.

The reinforcement elements may be incorporated in the annulus filler in any desired manner. For example, the annulus filler may include yarns that include both relatively high-modulus filaments and relatively tough polymer-based filaments. The annulus filler may include fabrics in which relatively high-modulus fibers and relatively tough polymer-based fibers are interwoven, or braids that include relatively high-modulus fibers and relatively tough polymer-based fibers. (As used herein, fibers include multiple filaments.) In some examples, instead of or in addition to including yarns, fabrics, filament windings, unidirectional tapes, or weaves including both relatively high-modulus reinforcement elements and relatively tough polymer-based reinforcement elements, relatively high-modulus reinforcement elements and relatively tough polymer-based reinforcement elements may be incorporated in the annulus filler separately. For example, a first yarn may include relatively high-modulus filaments and a second yarn may include relatively tough polymer-based filaments. As another example, a first fabric may include relatively high-modulus fibers and a second fabric may include relatively tough polymer-based fibers. As a further example, a first weave may include relatively high-modulus fibers and a second weave may include relatively tough polymer-based fibers. Additionally, or alternatively, the annulus filler may include chopped fibers that include relatively high-modulus reinforcement elements, relatively tough polymer-based reinforcement elements, or both.

In this way, by including both relatively high-modulus reinforcement elements and relatively tough polymer-based reinforcement elements, an annulus filler may possess increased toughness (i.e., reduce brittleness) compared to an annulus filler that does not include relatively tough polymer-based reinforcement elements, while still possessing relatively high stiffness and tensile strength. Further, as the relatively tough polymer-based reinforcement elements may be less dense than the relatively high-modulus reinforcement elements, an annulus filler that includes both relatively high-modulus reinforcement elements and relatively tough polymer-based reinforcement elements may be lighter than a similar annulus filler that does not include relatively tough polymer-based reinforcement elements.

Figure 2:
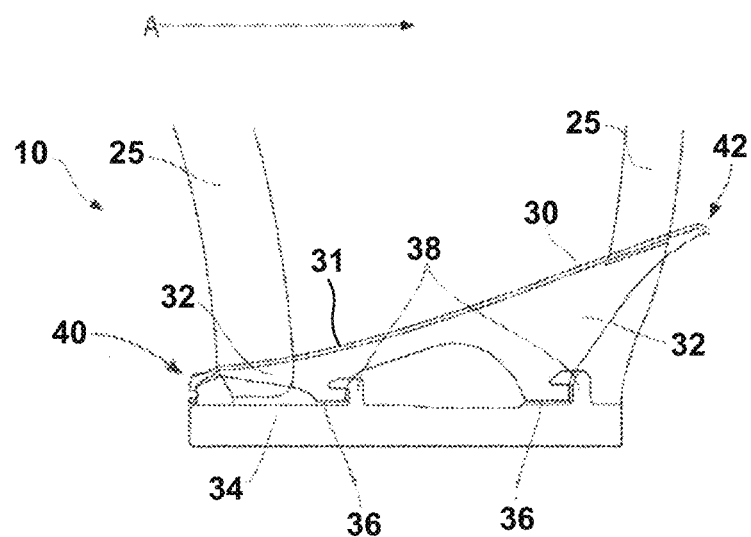
FIG. 2 is a schematic diagram illustrating a longitudinal cross-section view of an example annulus filler.

FIG. 2 is a schematic diagram illustrating a longitudinal cross-section view of an example annulus filler 30. Annulus filler 30 bridges the circumferential gap between two rotor blades 25 (although two structures in FIG. 2 are labeled 25, the two reference numerals 25 refer to the same rotor blade). In some examples, annulus filler 30 may include a composite material that includes both relatively high-modulus reinforcement elements and relatively tough polymer-based reinforcement elements, as described above with reference to FIG. 1. A composite material may provide greater strength (e.g., tensile strength) than a metallic material while also being lighter.

Annulus filler 30 includes an outer lid 31 which defines a radially inward airflow surface for air being drawn through gas turbine engine 10 in an X-X (FIG. 1; or A in FIG. 2) axial direction. Annulus filler 30 also includes a support structure 32 which connects outer lid 31 to a rotor disc 34. Rotor disc 34 may be a rotor disc of, for example, fan 12, low-pressure compressor 13, or high-pressure compressor 14 (FIG. 1). Also attached to rotor disc 34 are blades 25. For example, blades 25 may be attached to rotor disc 34 using complementary attachment structures, such as, for example, a fir tree recess and complementary root portion of blade 25.

Support structure 32 may include any suitable geometry for attaching annulus filler 30 to rotor disc 34. For example, support structure 32 may include two attachment straps 36 as shown in FIG. 2. The attachment straps 36 may interlock or physically contact with complementary hooks 38 included in rotor disc 34. Although FIG. 2 illustrates to attachments straps 36 and two complementary hooks 38, in other examples, support structure 32 and rotor disc 34 may include other mechanical features for attaching annulus filler 30 to rotor disc 34.

Annulus filler 30 also may include a first engageable portion 40 at a leading edge of annulus filler 30 and a second engageable portion 42 at a trailing edge of annulus filler 30. In some examples, first engageable portion 40 may include a portion of annulus filler 30 that defines into which a pin is inserted. Rotor disc 34 may define a similar hole that substantially aligns with the hole in first engageable portion 40, which also receives the pin. In some examples, another component, such as a spinner support ring, may include the hole or slot. In some examples, one or both of the first engageable portion 40 or rotor disc 34 may define threaded holes, and the pin may include complementary threads. The combination of first engageable portion 40, the pin, and the rotor disc 34 may reduce or substantially eliminate axial movement, radial movement, or both of annulus filler 30 relative to rotor disc 34.

In some examples, second engageable portion 42 may engage with a sealing component, such as a fan rear seal. Second engageable portion 42 may contribute to reduction or substantial elimination of axial or radial movement of annulus filler 30 while gas turbine engine 10 is in use.

As described above, annulus filler 30 includes a composite material that includes a matrix material, a plurality of relatively high-modulus reinforcement elements, and a plurality of relatively tough reinforcement elements. The plurality of relatively high-modulus reinforcement elements and the plurality of relatively tough reinforcement elements may define at least one reinforcement architecture. A reinforcement architecture may include a particular combination and physical arrangement of materials, such as a matrix material and at least one of a plurality of relatively high-modulus reinforcement elements or a plurality of relatively tough reinforcement elements. Annulus filler 30 may include one or more than one reinforcement architecture. The reinforcement architecture for a portion of the annulus filler may be selected according to desired properties of that portion of the annulus filler, such as mechanical properties.

In some examples, annulus filler 30 or a reinforcement architecture in annulus filler 30 may include a composite material which is substantially uniform mixture of matrix material, a plurality of relatively high-modulus reinforcement elements, and a plurality of relatively tough reinforcement elements, e.g., throughout an entire volume of annulus filler 30. This may provide substantially uniform mechanical properties to the annulus filler 30, e.g., substantially uniform stiffness, toughness, or the like. As described above, each of the plurality of relatively high-modulus reinforcement elements and a plurality of relatively tough reinforcement elements may include continuous fibers or filaments, chopped fibers or filaments, or the like. For example, a reinforcement architecture in annulus filler 30 may include a matrix material and a yarn that include both relatively high-modulus filaments and relatively tough polymer-based filaments. As other examples, a reinforcement architecture in annulus filler 30 may include a matrix material and a fabric in which relatively high-modulus fibers and relatively tough polymer-based fibers are interwoven, or a matrix material and a braid that include relatively high-modulus fibers and relatively tough polymer-based fibers. (As used herein, fibers include multiple filaments.)

In some examples, a reinforcement architecture in annulus filler 30 may exclude one of relatively high-modulus reinforcement elements or relatively tough polymer-based reinforcement elements. In some examples, a reinforcement architecture in annulus filler 30 may include matrix material and chopped fibers that include relatively high-modulus reinforcement elements, relatively tough polymer-based reinforcement elements, or both. Other combinations are also possible, for example, a reinforcement architecture may include a matrix material, chopped carbon fibers, and chopped, woven, or braided relatively tough reinforcement elements.

In some examples, annulus filler 30 may include multiple reinforcement architectures, such as a first region that includes a first reinforcement architecture and a second region that includes a second reinforcement architecture. The first reinforcement architecture may be selected to provide desired properties to the first region and the second reinforcement architecture may be selected to provide desired properties to the second region. For example, the first region may include a reinforcement architecture that includes a greater ratio of relatively high-modulus reinforcement elements to relatively tough reinforcement elements compared a ratio of high-modulus reinforcement elements to relatively tough reinforcement elements included within the second region. The first region thus may possess greater stiffness than the second region, while the second regions possesses greater toughness than the first region. In some examples, the second region may include at least one of outer lid 31, one or both of attachment straps 36, first engageable portion 40, or second engageable portion 42. These regions may benefit from increased toughness, as these regions may be more likely to experience abrupt mechanical stresses during use of gas turbine engine 10. In some examples, the first region may include the remainder of annulus filler 30 excluding the second region, for example, the first region may include support structure 32. The first region may be stiffer and better able to resist centrifugal forces acting upon annulus filler 30 during operation of gas turbine engine 10.

Figure 3:
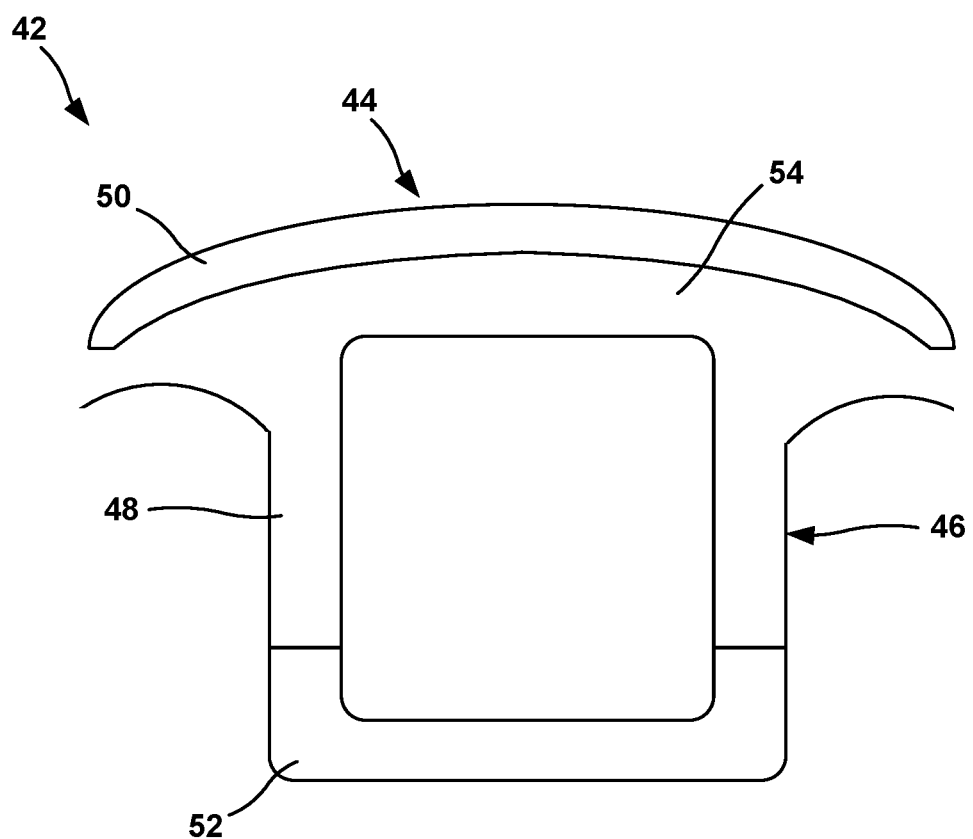
FIG. 3 is a schematic diagram illustrating a transverse cross-section of an example annulus filler.

FIG. 3 is a conceptual transverse cross-sectional diagram illustrating an example of a composition of an annulus filler 42. Annulus filler 42 includes an outer lid 44 and a support structure 46. Support structure 46 defines a generally U-shaped structure attached to a bottom side of outer lid 44 and includes both walls 48 and an attachment strap 52. As shown by the shading in FIG. 3, at least an outer portion 50 of outer lid 44 may include a first region including a first reinforcement architecture, at least an inner portion 54 of outer lid 44 and walls 48 include a second region including a second reinforcement architecture, and attachment strap 52 includes a third region including a third reinforcement architecture. As described above, each of the first, second, and third reinforcement architectures may be selected to provide desired properties to outer portion 50, inner portion 54 and walls 48, and attachment strap 52, respectively. For example, outer portion 50 may include a greater ratio of relatively tough reinforcement elements to relatively high-modulus reinforcement elements compared the ratio of relatively tough reinforcement elements to relatively high-modulus reinforcement elements included within inner portion 54 and walls 48. Similarly, attachment strap 52 may include a greater ratio of relatively tough reinforcement elements to relatively high-modulus reinforcement elements compared the ratio of relatively tough reinforcement elements to relatively high-modulus reinforcement elements included within inner portion 54 and walls 48. Conversely, inner portion 54 and walls 48 may include a greater ratio of relatively high-modulus reinforcement elements to relatively tough reinforcement elements compared the ratio of relatively high-modulus reinforcement elements to relatively tough reinforcement elements included within outer portion 50 and attachment strap 52. As such, outer portion 50 may be tougher and better able to absorb energy from strikes by foreign objects, e.g. hailstones and birds, due to the higher ratio of relatively tough reinforcement elements compared to relatively high-modulus reinforcement elements included in the reinforcement architecture in that region, while inner portion 54 and walls 48 may be stronger and stiffer, such that they may be better able to resist the centrifugal forces acting upon annulus filler 42 and, consequently, may be better able to resist deformation due to the higher ratio of high-modulus reinforcement elements compared to low-modulus reinforcement elements in that region.

Figure 4:
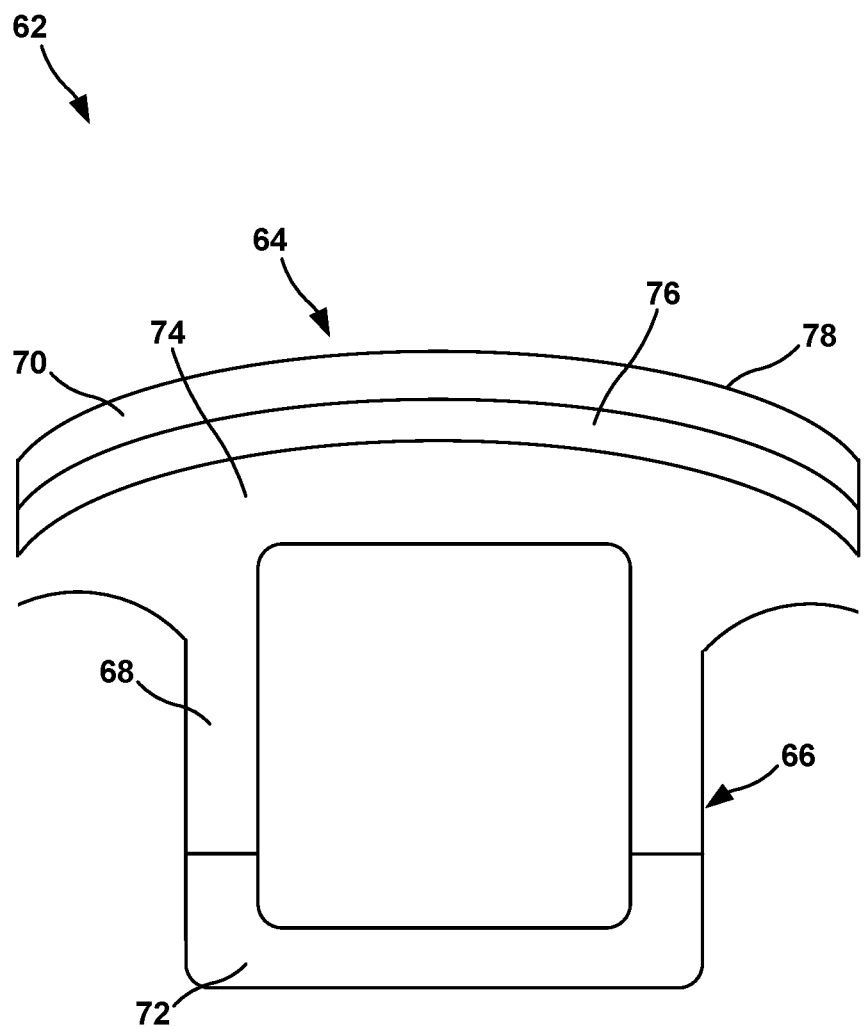
FIG. 4 is a schematic diagram illustrating a transverse cross-section of another example annulus filler.

In some examples, an annulus filler may include other materials in addition to a matrix material, relatively high-modulus reinforcement elements, and relatively tough reinforcement elements. For example, an annulus filler may include a low-density material, an erosion resistant coating, or both. FIG. 4 is a conceptual transverse cross-sectional diagram illustrating an example annulus filler 62. Annulus filler 62 may include an outer lid 64 and a support structure 66. Support structure 66 defines a generally U-shaped structure attached to a bottom side of outer lid 64, and includes both walls 68 and an attachment strap 72. As shown by the shading in FIG. 4, at least an outer portion 70 of outer lid 64 may include a first region including a first reinforcement architecture, at least an inner portion 74 of outer lid 64 and walls 68 include a second region including a second reinforcement architecture, and attachment strap 72 includes a third region including a third reinforcement architecture. As described above, each of the first, second, and third reinforcement architectures may be selected to provide desired properties to outer portion 50, inner portion 54 and walls 48, and attachment strap 52, respectively.

Further, annulus filler 62 includes a low-density core 76 between outer portion 70 and inner portion 74 of outer lid 64. Low density core 76 may include a low-density material, such as a foam, balsa wood, birch wood, a honeycomb material, or the like. The low-density core 76 may reduce weight of annulus filler 62, while the sandwich-type structure of reinforcement architectures on either side of low density core 76 may provide sufficient mechanical properties to annulus filler 62.

In some examples, annulus filler 62 optionally may include an erosion resistant coating 78, e.g., on an outer surface of outer lid 64. Erosion resistant coating 78 may be an erosion-resistant polymeric film that is adhered or co-cured to annulus filler 62. In some examples, erosion resistant coating 78 may include, for example, a polyvinyl fluoride film available under the trade designation DuPont™ Tedlar®, or a polyurethane film available under the trade designation 3M™ Polyurethane Protective Tape 8734NA. In examples in which erosion resistant coating 78 is adhered to annulus filler 62, the erosion resistant coating 78 may be replaceable upon damage to the erosion resistant coating 78 while reducing or substantially preventing erosion damage to the underlying annulus filler 62. In some examples, erosion resistant coating 78 may have a relatively high elongation at break (e.g., similar to the relatively tough reinforcement elements), which may contribute to toughness of annulus filler 62.

An annulus filler may include any combination of the reinforcement architectures described herein. For example, an annulus filler may include an outer surface of an outer lid that includes a reinforcement architecture including a matrix material and a majority relatively tough reinforcement elements or only relatively tough reinforcement elements. As another example, an annulus filler may include an outer surface of the entire annular filler that includes a reinforcement architecture including a matrix material and a majority relatively tough reinforcement elements or only relatively tough reinforcement elements. As a further example, an annulus filler may include a low-density core material, such as a foam, wrapped in co-woven or braided reinforcement material that includes both relatively tough reinforcement elements and relatively high-modulus reinforcement elements. As an additional example, an annulus filler may include hybrid fibers that include relatively tough reinforcement filaments and relatively high-modulus reinforcement filaments, where the fibers are then woven or braided. As another example, an annulus filler may include may include a first reinforcement architecture that constitutes a majority of the volume of the annulus filler and includes chopped relatively high-modulus reinforcement elements, with an outer portion of the outer lid including a second reinforcement architecture that includes relatively tough reinforcement elements, e.g., woven alone or co-woven with relatively high-modulus reinforcement elements.

Figure 5:
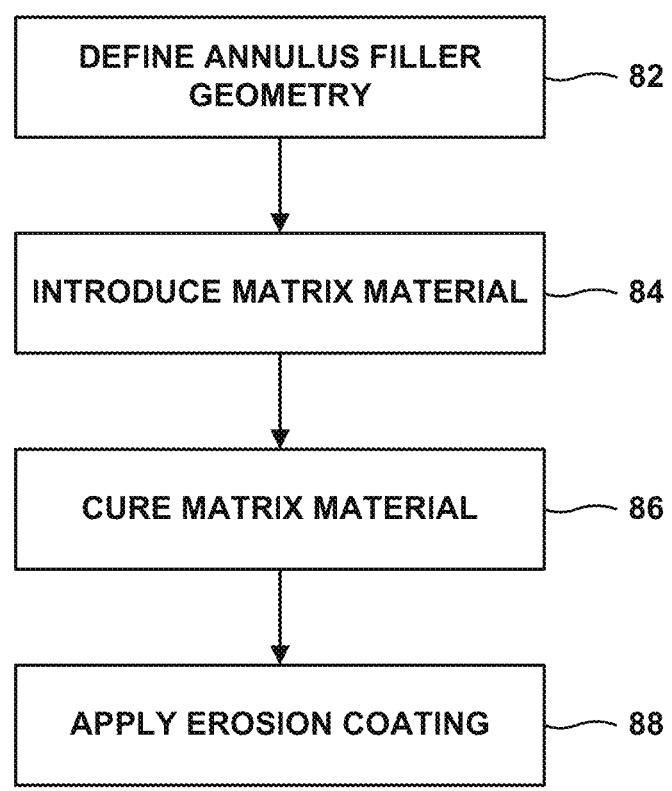
FIG. 5 is a flowchart illustrating an example technique for forming an annulus filler.

The annulus fillers described herein may be formed using a variety of techniques, including for example, pre-preg and cure, resin transfer molding, or the like. FIG. 5 is a flow diagram illustrating an example technique for forming an annulus filler. The technique of FIG. 5 will be described with reference to annulus filler 30 of FIG. 2, although one of ordinary skill in the art will appreciate that similar techniques may be used to form other annulus fillers, e.g., annulus filler 42 of FIG. 3 and annulus filler 64 of FIG. 4.

The technique of FIG. 5 includes defining a geometry of annulus filler 30 (82). The geometry of annulus filler 30 may be defined using one or more techniques. For example, woven or braided reinforcement elements may be disposed within or about a mold, mandrel, or the like, to define a shape of at least a portion of annulus filler 30. As another example, chopped reinforcement elements may be deposited in a mold, where the mold defines a shape of at least a portion of annulus filler 30. In some examples, two or more of these techniques may be combined to define a geometry of annulus filler 30. For example, woven or braided reinforcement elements may be laid up in a mold, around a mandrel, or both, then chopped fibers may be disposed to fill the mold.

While defining the geometry of annulus filler 30 (82), in some examples, the reinforcement elements may be disposed in selected orientations, regions, or both. For example, as described above, in some examples, annulus filler 30 may include multiple reinforcement architectures. While defining the geometry of annulus filler 30 (82), the relatively high-modulus reinforcement elements and the relatively rough reinforcement elements may be positioned in selected orientations and regions of annulus filler 30 to define the selected reinforcement architectures at the selected regions of annulus filler 30.

The technique in FIG. 5 also may include introducing a matrix material around the reinforcement elements (84). In some examples, the matrix material (e.g., an uncured form of the matrix material) may be introduced around at least some of the reinforcement elements prior to defining the geometry of annulus filler 30 (82). For example, at least some of the reinforcement elements (relatively high-modulus reinforcement fibers, relatively tough reinforcement fibers, or both) may be in a sheet of prepreg, in which an uncured or partially cured form of the matrix material at least partially surrounds the reinforcement elements. In some examples, the matrix material may be introduced around the reinforcement elements (84) after defining the geometry of annulus filler 30 (82). For example, resin transfer molding may be used to introduce matrix material or a precursor of matrix material into a mold that contains reinforcement elements. In some examples, e.g., examples in which annulus filler 30 includes both chopped reinforcement elements and woven or braided reinforcement elements, matrix material may be introduced both before and after defining the geometry of annulus filler 30 (82).

Once the matrix material is introduced (84), the matrix material may be cured (86). The matrix material may be cured by introduction energy to the matrix material, e.g., via heat, infrared radiation, or the like. Curing the matrix material may result in annulus filler 30.

In some examples, the technique in FIG. 5 may optionally include applying erosion resistant coating 78 (FIG. 4) to annulus filler 30 (88). In some examples, erosion resistant coating 78 may be applied prior to curing of the matrix material (86), such that the erosion resistant coating 78 is cured into annulus filler 30. In other examples, erosion resistant coating 78 may be applied after curing of the matrix material (86), which may allow erosion resistant coating 78 to be removed form annulus filler 30, e.g., in response to damage to erosion resistant coating 78. This may allow erosion resistant coating 78 to be replaced without necessitating an entire new annulus filler 30.

Various examples have been described. These and other examples are within the scope of the following claims.

What is claimed is:

1. An annulus filler comprising:
   an outer lid defining an airflow surface for air being drawn through an engine in an axial airflow direction; and
   a support structure configured to connect the outer lid to a rotor disc, wherein the annulus filler comprises a composite material including a plurality of relatively high-modulus reinforcement elements, a plurality of relatively tough polymer-based reinforcement elements, and a matrix material substantially encapsulating the plurality of relatively high-modulus reinforcement elements and the plurality of relatively tough reinforcement elements, wherein the plurality of relatively tough reinforcement elements have an elongation at break of greater than 6.0%.

2. The annulus filler of claim 1, wherein the support structure comprises:
   two support walls extending from opposing lateral sides of the outer lid;
   an attachment strap for receiving a complementary number of hooks on the rotor disc, wherein the attachment strap bridges the support walls; and
   a leading engagement portion and a trailing engagement portion.

3. The annulus filler of claim 1, wherein the plurality of relatively high-modulus reinforcement elements have a Young's modulus of greater than 60 GPa and an elongation at break of less than 6.0%.

4. The annulus filler of claim 3, wherein the plurality of relatively high-modulus reinforcement elements comprise at least one of an aromatic polyamide, a carbon fiber, E-glass, or S-glass.

5. The annulus filler of claim 1, wherein the plurality of relatively tough reinforcement elements comprise at least one of a polyamide, a polyester, a polyester terephthalate, a polypropylene, a polyethylene, or a spider silk.

6. The annulus filler of claim 1, wherein the annulus filler comprises a substantially homogeneous combination of the plurality of relatively high-modulus reinforcement elements and the plurality of relatively tough reinforcement elements.

7. The annulus filler of claim 1, wherein the plurality of relatively high-modulus reinforcement elements comprise relatively high-modulus filaments, wherein the plurality of relatively tough polymer-based reinforcement elements comprise relatively tough polymer-based filaments, and wherein the relatively high-modulus filaments and relatively tough polymer-based filaments are together in a hybrid fiber.

8. The annulus filler of claim 1, wherein the plurality of relatively high-modulus reinforcement elements comprise chopped fibers, and wherein the plurality of relatively tough polymer-based reinforcement elements comprise at least one of woven fibers, yarn, or braided fibers.

9. The annulus filler of claim 1, wherein the matrix material cures at a temperature of 150° C. or less.

10. The annulus filler of claim 9, wherein the matrix material cures in less than one hour.

11. The annulus filler of claim 1, further comprising a low-density core.

12. The annulus filler of claim 1, further comprising an erosion resistant coating on at least one surface of the annulus filler.

13. An annulus filler comprising:
an outer lid defining an airflow surface for air being drawn through an engine in an axial airflow direction; and
a support structure configured to connect the outer lid to a rotor disc, wherein the annulus filler comprises a composite material including a plurality of relatively high-modulus reinforcement elements, a plurality of relatively tough polymer-based reinforcement elements, and a matrix material substantially encapsulating the plurality of relatively high-modulus reinforcement elements and the plurality of relatively tough reinforcement elements, wherein the annulus filler comprises a first region and a second region, wherein the first region comprises a greater ratio of relatively high-modulus reinforcement elements to relatively tough reinforcement elements than a ratio of relatively high-modulus reinforcement elements to relatively tough reinforcement elements comprised in the second region.

14. The annulus filler of claim 13, wherein the second region comprises an exterior surface of the annulus filler and the first region is the remainder of the annulus filler excluding the exterior surface.

15. The annulus filler of claim 13, wherein the second region is at least one of an outer portion of the outer lid of the annulus filler, the attachment strap, a leading engagement portion, or a trailing engagement portion.

16. A method of constructing an annulus filler, the method comprising:
defining an annulus filler with a matrix material, a plurality of relatively high-modulus reinforcement elements and a plurality of relatively tough reinforcement elements, wherein the plurality of relatively tough reinforcement elements have an elongation at break of greater than 6.0%, and wherein the annulus filler comprises an outer lid and a support structure; and
curing a matrix material substantially encapsulating the plurality of relatively high-modulus reinforcement elements and the plurality of relatively tough reinforcement elements.

17. The method of claim 16, wherein the defining the annulus filler comprises introducing a matrix material or matrix material precursor using resin transfer molding.

18. The method of claim 16, further comprising forming an erosion resistant coating on at least one surface of the annulus filler.

19. The method of claim 16, wherein curing the matrix material comprises heating the matrix material at a temperature of 150° C. or less.

* * * * *